Aug. 7, 1923.

E. H. JONES 1,464,076

DEPOSITING METAL BY THE ELECTRIC ARC

Filed Sept. 29, 1917

INVENTOR:
Ernest Henry Jones
By Wm Wallace White
ATTY.

Patented Aug. 7, 1923.

1,464,076

UNITED STATES PATENT OFFICE.

ERNEST HENRY JONES, OF CANONBURY, LONDON, ENGLAND.

DEPOSITING METAL BY THE ELECTRIC ARC.

Application filed September 29, 1917. Serial No. 193,943.

*To all whom it may concern:*

Be it known that I, ERNEST HENRY JONES, subject of the King of Great Britain, residing at 4 Grange Road, Canonbury, London, N., England, engineer, have invented new and useful Improvements in Depositing Metal by the Electric Arc (for which I have filed applications in England Sept. 20, 1916, Patent No. 109,321, April 12, 1917, Patent No. 109,652), of which the following is a specification.

My invention has reference to the known method of depositing metal by the electric arc, and has for its objects improvements whereby the metal may be deposited without undue loss and whereby the deposited metal may be rendered free from blow holes or the like.

According to my invention, as applied to machine tools by way of example, the body of the tool may be formed of mild steel and the part usually occupied by and adjacent to the cutting edge is or may be removed to leave room for the electric deposition of "high speed steel" and after sufficient metal has been deposited, the added metal is subjected to subsequent heating to remove blow holes therefrom. In order that the deposited steel may be caused to heap up without undue loss, the tool or the cutting end thereof is placed in a mould or a mould is built up around the same to confine the fused metal, the mould being formed of suitable refractory materials.

I have found that the mould has to be constructed of carefully selected material, as an "acid" material (i. e. a material in which silica forms a fairly high proportion) is in some cases unsuitable as the silica is decomposed under heat of the electric arc and silicon is reduced and alloys with the molten steel.

Figure 1:
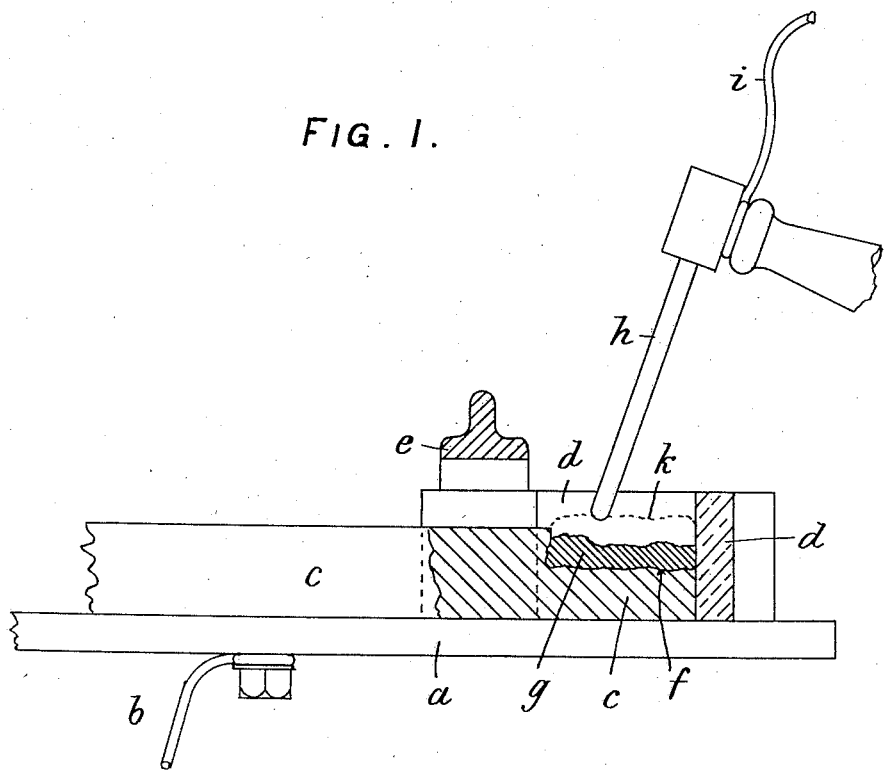
Figure 2:
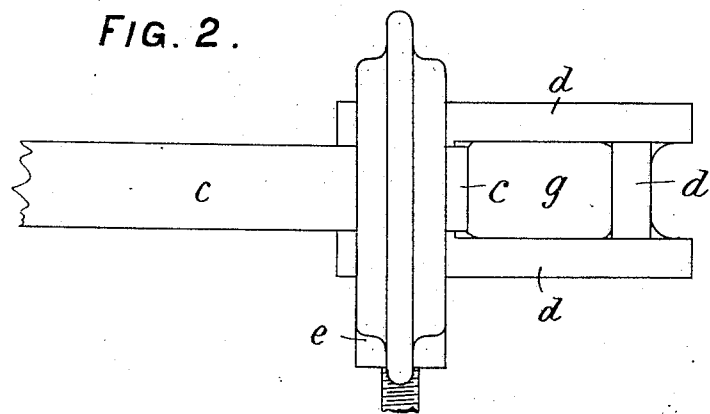

The invention is illustrated by the accompanying drawings in which Fig. 1 is a sectional elevation showing a machine tool with a part of the "high speed" steel electrically deposited on the cutting end. Fig. 2 is a plan showing a convenient type of mould for use in the process.

$a$ is a suitable metal bed electrically connected at $b$ with one pole of the source of electric current. $c$ is a tool body of mild steel or the like, the cutting end of which is arranged in a mould $d$ suitably clamped to the tool such as by a clamp $e$. The end of the tool body, which had previously been shaped with a cut-away part $f$, is shown with a portion of the requisite "high speed" steel $g$ electrically deposited from the metal electrode $h$ which is connected at $i$ to the other pole of the current. The metal electrode $h$ is composed of all the materials necessary for depositing "high speed" steel, and is held in a suitable insulated handle. The electric current is caused to arc across the space between the lower end of the electrode $h$ and the metal $g$ and in so doing fuses the metal of the electrode and deposits same until the added metal reaches a thickness approximately indicated by the dotted line $k$. The metal $g$ is then kept in a state of fusion by a carbon electrode substituted for the electrode $h$ or by a suitable blowpipe for a sufficient time to allow the fluid metal to settle and permit the gases therein to escape.

Preferably, the mould $d$ is of a sufficient width to allow the metal $g$ to project slightly beyond the width of the tool $c$, so that when the metal $g$ has sufficiently cooled down the metal $g$ may be ground to the desired shape of cutting edge.

In some cases it is desirable to use a mould of "basic" material such as lime, dolomite, or magnetite for example and in constructing the mould any of the foregoing materials may be formed into moulds of the required shape by any well known method, I have found that very satisfactory moulds for this work can be made by using the spent material resulting from the manufacture of acetylene gas from calcium carbide, which material is at present a waste product, with this material I mix, for example, a proportion (say 5 to 10%) of sodium silicate which by the well known action of silica upon lime, causes it to set hard, and it is found that the proportion of sodium silicate required is not sufficient to alter the basic properties of the material.

Another way of making moulds for any classes of work consists of preparing pieces of basic material in the form of tiles in which form they can be adjusted to the work and maintained in position by clips or clamps any close joint required being made by using some of the material in a moist state.

When the metal is deposited electrically it is frequently found to contain blow holes, and with the object of removing same the deposited metal, while still in the mould, is subjected to subsequent heating by an electric arc, with, for example a carbon electrode, or by an oxyacetylene gas flame. By this means the deposited metal subsides into a homogeneous mass free from blow holes or flaws, probably caused by occluded gas.

The materials necessary for electrically depositing "high speed" steel are combined in one electrode and covered with slag forming material preferably asbestos yarn, so that under the influence of the electric arc "high speed" steel of any required variety or character may be deposited.

For this purpose the electrode may consist of channel section mild steel within which the mixture is located. A very satisfactory mixture contains the following ingredients: carbon 1.30% tungsten 22% chromium 9%, vanadium 25%.

The proportions of the different rare metals may be varied very considerably, for instance, many "high speed" steels do not contain more than about 6% of tungsten. Molybdenum may be used in place of a part of the tungsten, but it does not seem to show any advantage over tungsten.

It will be understood that although I have described my invention as applied to depositing and settling "high speed steel" on machine tools, the invention is equally applicable to other alloys or metals and to other parts of machinery and other articles where a homogeneous deposit of metal is required, as for example a bearing surface or other surface or point where it is desirable to resist undue wear or to make good a defect.

Having now particularly described and ascertained the nature of my said invention and in what manner the same is to be performed, I declare that what I claim is:—

The process of applying a high speed steel cutting edge to a tool, which consists in securing said tool within an enclosing mould, the tool being electrically connected with one pole of a source of current, applying to said tool one end of an electrode containing the materials necessary to produce when fused a metal of the character required, said electrode being electrically connected with the other pole of the source of current, holding said electrode in contact with said tool until a sufficient quantity of the electrode has been fused, then substituting a carbon electrode for said metal electrode and continuing the passage of the current while the tool remains in the mould until the deposited metal subsides into a homogeneous mass free from blowholes.

In testimony whereof I have signed my name to this specification in the presence of a subscribing witness.

ERNEST HENRY JONES.

Witness:
ARTHUR C. DOWNING.